US007548357B2

(12) United States Patent
Moriya

(10) Patent No.: US 7,548,357 B2
(45) Date of Patent: Jun. 16, 2009

(54) IMAGE PROCESSING DEVICE, IMAGE DISPLAY DEVICE, IMAGE PROCESSING METHOD, AND IMAGE PROCESSING PROGRAM

(75) Inventor: Hidekuni Moriya, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 846 days.

(21) Appl. No.: 11/022,988

(22) Filed: Dec. 28, 2004

(65) Prior Publication Data
US 2005/0169524 A1 Aug. 4, 2005

(30) Foreign Application Priority Data
Jan. 16, 2004 (JP) ............................. 2004-009161

(51) Int. Cl.
*G03F 3/08* (2006.01)
*G06K 9/00* (2006.01)

(52) U.S. Cl. ..................... 358/520; 358/518; 358/519; 358/521; 358/522; 382/162; 382/167; 382/168; 382/254; 382/274

(58) Field of Classification Search ................ 345/589; 348/645; 358/518, 519, 520, 521, 522, 527; 382/167, 168, 169
See application file for complete search history.

(56) References Cited

U.S. PATENT DOCUMENTS

| 5,123,060 | A | * | 6/1992 | Cho et al. | 382/274 |
| 5,363,218 | A | * | 11/1994 | Hoshino | 358/518 |
| 5,446,504 | A | * | 8/1995 | Wada | 348/645 |
| 5,450,217 | A | * | 9/1995 | Eschbach et al. | 358/518 |
| 5,539,540 | A | * | 7/1996 | Spaulding et al. | 358/518 |
| 5,668,890 | A | * | 9/1997 | Winkelman | 382/167 |
| 5,966,222 | A | * | 10/1999 | Hirata et al. | 358/520 |
| 6,002,806 | A | * | 12/1999 | Morikawa | 382/274 |
| 6,229,580 | B1 | * | 5/2001 | Inoue | 348/649 |
| 6,724,507 | B1 | * | 4/2004 | Ikegami et al. | 358/518 |
| 6,791,606 | B1 | * | 9/2004 | Miyano | 348/223.1 |

(Continued)

FOREIGN PATENT DOCUMENTS

JP   A 05-205039   8/1993

(Continued)

*Primary Examiner*—King Y Poon
*Assistant Examiner*—Richard Z Zhu
(74) *Attorney, Agent, or Firm*—Oliff & Berridge PLC

(57) ABSTRACT

Aspects of the invention relate to a method of processing images capable of performing natural saturation enhancement having a balance between color components with a small amount of calculation is provided. The image processing device may be arranged in an image display device or may be a device for providing display image data to the external image display device to perform the saturation enhancement of the input image data. Specifically, saturation information can be extracted from the input image data to determine a saturation enhancement amount. In addition, a color component to which the saturation enhancement is performed can be extracted from the input image data. Further, based on the determined saturation enhancement amount, the saturation enhancement for each color component can be performed. Here, for the predetermined color component, the saturation is enhanced after the saturation enhancement amount is adjusted. The color component included in the input image data may be, for example, Cb and Cr in the YCbCr color space. The saturation enhancement amount is adjusted to the predetermined color component. Therefore, the color balance of the image data after the saturation can be properly adjusted and the natural image data can be obtained.

10 Claims, 13 Drawing Sheets

U.S. PATENT DOCUMENTS

| | | | |
|---|---|---|---|
| 6,823,083 B1 * | 11/2004 | Watanabe et al. | 382/167 |
| 6,954,549 B2 * | 10/2005 | Kraft | 382/167 |
| 7,006,251 B2 * | 2/2006 | Fujino | 358/1.9 |
| 7,251,057 B2 * | 7/2007 | Tsujino et al. | 358/1.9 |
| 7,339,619 B2 * | 3/2008 | Tsuruoka | 348/234 |
| 7,355,753 B2 * | 4/2008 | Yao | 358/1.9 |
| 2002/0080376 A1 | 6/2002 | Momose et al. | |
| 2004/0013298 A1 * | 1/2004 | Choe et al. | 382/167 |

FOREIGN PATENT DOCUMENTS

| | | |
|---|---|---|
| JP | A 06-339017 | 12/1994 |
| JP | A 08-037603 | 6/1996 |
| JP | A 09-163164 | 6/1997 |
| JP | A 10-200777 | 7/1998 |
| JP | A 2000-013626 | 1/2000 |
| JP | A 2000-123163 | 4/2000 |
| JP | A 2001-218078 | 8/2001 |
| JP | 2002-33934 | 6/2002 |
| JP | 2004-007301 | 8/2004 |

* cited by examiner

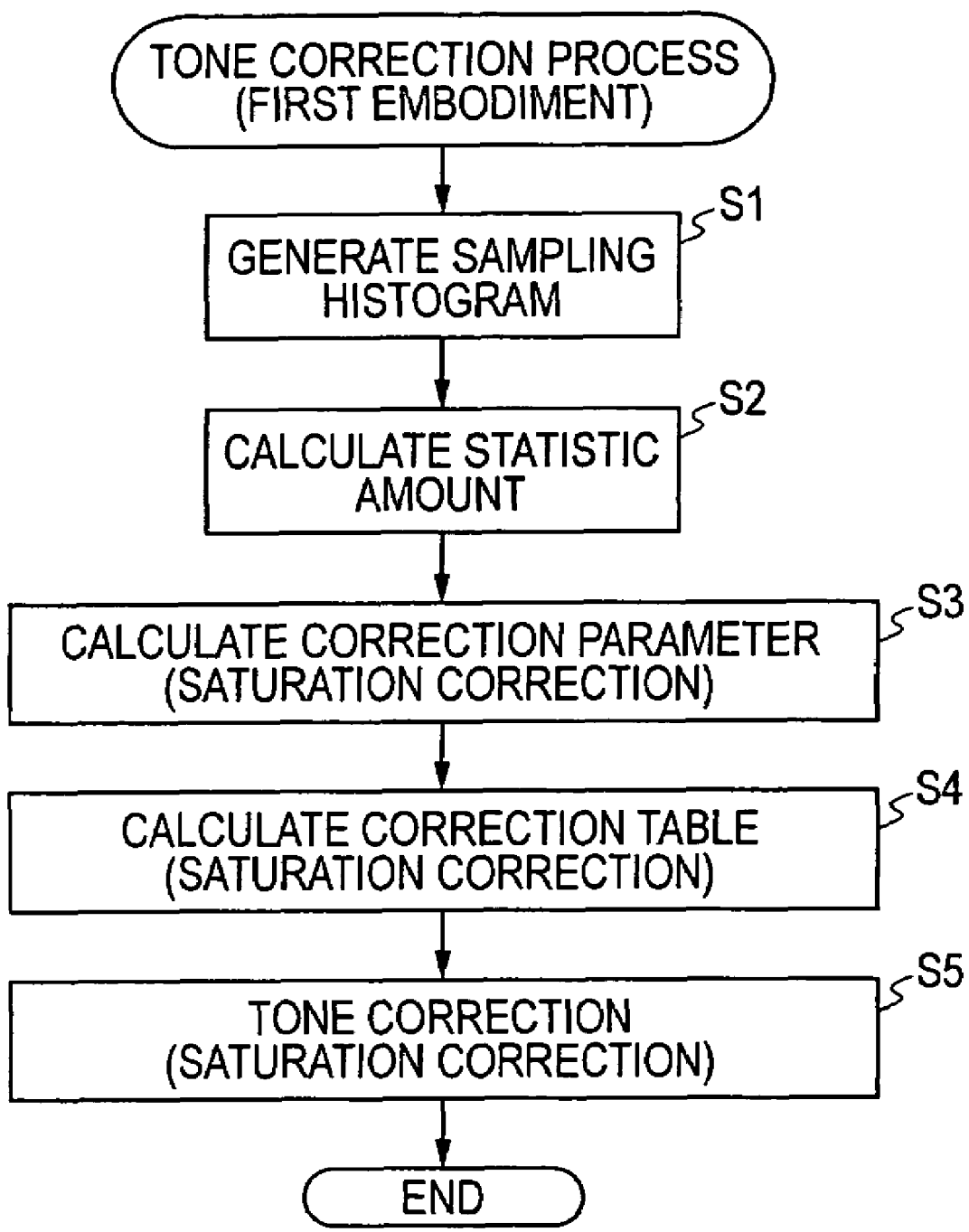

SAMPLING WITH RESPECT TO ENTIRE IMAGE

SAMPLING WITH RESPECT TO CENTER AREA

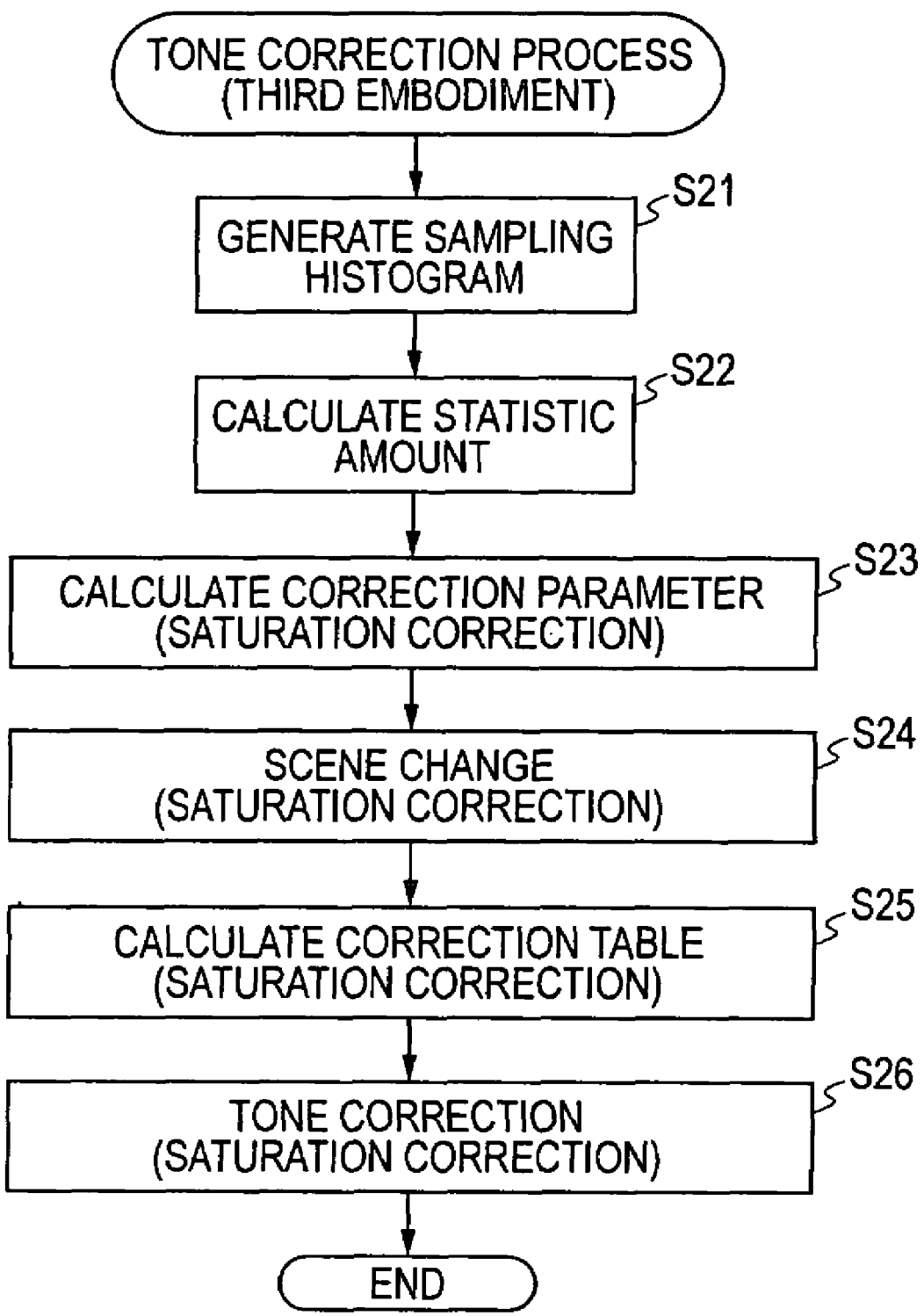

IMAGE PROCESSING DEVICE, IMAGE DISPLAY DEVICE, IMAGE PROCESSING METHOD, AND IMAGE PROCESSING PROGRAM

BACKGROUND

Aspects of the invention can relate to an image processing technique which corrects the saturation of color images.

In related art image display devices, when the saturation of the input color image is insufficient, a correcting process can be performed in order to enhance the saturation. Examples of such saturation enhancement process are disclosed in, for example, Japanese Unexamined Patent Application Publication No. 2001-218078. According to this process, the maximum saturation is detected from the input color image data, a saturation correction table is made with the maximum saturation as the maximum. In this case, the saturation correction table is set so as to have a curve in which the saturation of the output image data becomes larger than the saturation of the input image data. Therefore, the saturation is corrected by using the saturation correction table. Since the saturation correction table is made after previously detecting the maximum saturation, output after the saturation correction does not exceed the maximum saturation, that is, the color deformation does not occur. However, according to the technique, it is necessary to frequently calculate the maximum saturation from the input color image data. Thus, the calculation amount increases.

Further, in most saturation enhancing processes, the same enhancing process is performed on all of the color components in RGB, YUV color space. However, in the case of performing the same enhancing process on the all of the color components, unbalance between the color components and an unnatural processed image may be obtained.

SUMMARY

Aspects of the invention can provide an image processing technique which is capable of performing a saturation enhancement with a well balance between color components and a reduced calculation amount.

According to an aspect of the invention, there can be provided an image processing device including a saturation-enhancement-amount determining device for determining the saturation enhancement amount by extracting saturation information from input image data, a color component extracting device for extracting from the input image data a plurality of color components having saturation to be enhanced, a saturation enhancing device for enhancing the saturations of the plurality of color components based on the determined saturation enhancement amount, and an enhancement-amount adjusting device for adjusting the determined saturation enhancement amount when enhancing a saturation of a predetermined color component among the plurality of color components.

The image processing device can be provided in an image display device. Alternatively, the image processing device can be provided as a device for providing display image data to the external image display device. More specifically, saturation information is extracted from input image data to determine the saturation enhancement amount. Further, a color component enhancing the saturation is extracted from the input image data. In addition, the saturation enhancement with respect to the respective color components can be performed based on the determined saturation enhancement amount. Here, for predetermined color components, the saturation is enhanced after the saturation enhancement amount is adjusted. The color components included in the input image data can be, for example, Cb and Cr in an YCbCr color space. For the predetermined color components, a color balance of image data after the saturation enhancement can be properly adjusted by adjusting the saturation enhancement amount so that the natural color data can be obtained.

One aspect of the image processing device can include a brightness information extracting device for extracting from the input image data brightness information, and the enhancement-amount adjusting device can adjust the saturation enhancement amount based on the extracted brightness information. When the saturation is enhanced, the effect of the saturation enhancement can be given based on the brightness of the input image data, for a specific color component. For example, for the Cb component, the effect of the saturation enhancement is reduced when a blue component corresponding to a positive direction of the Cb component is clipped in case that the brightness is high. However, a yellow component corresponding to a negative direction is not clipped and the effect of the saturation enhancement can be given as arranged, so that the color balance may not be achieved. For this reason, the color balance can be achieved by adjusting the saturation enhancement amount based on brightness information for the predetermined color component.

In the above aspect of the image processing device, the enhancement-amount adjusting device can reduce the saturation enhancement amount when the brightness included in the extracted brightness information is high. For the Cb component, when the brightness is high, the saturation enhancement amount is reduced in the negative direction of the Cb component. Therefore, the enhancement of the positive and negative directions of the Cb component (i.e., blue component and yellow component) can be adjusted to be equal so that the color balance can be maintained.

According to the above aspect of the image processing device, the enhancement-amount adjusting device can adjust the saturation enhancement amount such that the enhancement amount of the negative region of the predetermined color component for a color space is smaller than the enhancement amount in at positive region thereof.

According to the preferred embodiment, the enhancement-amount adjusting device makes the enhancement amount in the negative direction of the predetermined color component to be equal to an enhancement amount in the positive direction multiplied by a coefficient $\alpha$ ($0<\alpha<1$). Preferably, when an average value of brightness information is below the predetermined value, the coefficient $\alpha$ is a fixed value, and as the average value of the brightness information becomes larger, the average value can be reduced smaller than the fixed value.

In addition, according to another aspect of the invention, the image processing device can include a brightness correcting device for correcting the brightness component included in the input image data. The coefficient $\alpha$ is considered as a fixed value irrespective of the brightness information. When the brightness is not corrected at the same time along with the saturation correction, the correction is made in a manner of increasing the brightness in many cases. Therefore, the saturation enhancement amount having a color component (i.e., yellow component) corresponding the negative direction of the Cb component, for example, may be uniformly reduced so that the color balance can be maintained.

According to the preferred embodiments of the invention, the predetermined color component for the color space may be a Cb color component in a YCbCr color space.

According to another preferred embodiment of the invention, the input image data can be a moving image data including a plurality of frame image data, and scene-change detecting device for generating a control signal according to a degree of changing data scene of the moving image data may be included. The enhancement-amount adjusting device weights the coefficient α corresponding to the plurality of frame images based on the control signal to calculate the coefficient α in the corresponding frame image. With this, even for the prior and next scene change, the appropriate coefficient α can be determined so that the natural saturation enhancement can be achieved.

With the image processing device and the image display device having a display unit for displaying an output from the image processing device, the input image data can be displayed such that the color balance is achieved while the saturation enhancement is performed.

According to another aspect of the invention, there can be provided an image processing method including a saturation enhancement amount determining step of determining the saturation enhancement amount by extracting saturation information from input image data, a color component extracting step of extracting from the input image data a plurality of color components having saturation to be enhanced, a saturation enhancing step of enhancing the saturations of the plurality of color components based on the determined saturation enhancement amount, and an enhancement-amount adjusting step of adjusting the determined saturation enhancement amount when enhancing a saturation of a predetermined color component among the plurality of color components.

According to another aspect of the invention, there is provided an image processing program which can be executed by a computer and which allows the computer function as a saturation-enhancement-amount determining device for determining the saturation enhancement amount by extracting from input image data saturation information, a color component extracting device for extracting from the input image data a plurality of color components having saturation to be enhanced, a saturation enhancing device of enhancing the saturations of the plurality of color components based on the determined saturation enhancement amount, and an enhancement-amount adjusting device for adjusting the determined saturation enhancement amount when enhancing a saturation of a predetermined color component among the plurality of color components.

BRIEF DESCRIPTION OF THE DRAWINGS

The invention will be described with reference to the accompanying drawings, wherein like numerals reference like elements, and wherein:

FIG. 12 is a flow chart of an exemplary tone correction process according to a first exemplary embodiment of the invention;
FIG. 23 is a flow chart of an exemplary tone correction process according to the third exemplary embodiment of the invention.

DETAILED DESCRIPTION OF PREFERRED EMBODIMENTS

An outline of the saturation enhancement process according to the invention will be firstly explained, prior to description of preferred embodiments thereof.

Figure 1:
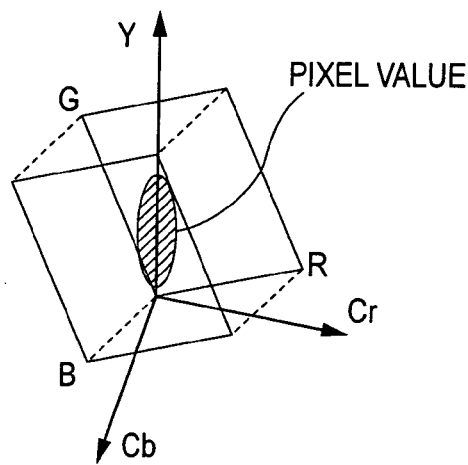
FIG. 1 shows a distribution of pixel values in a color space.
Figure 2:
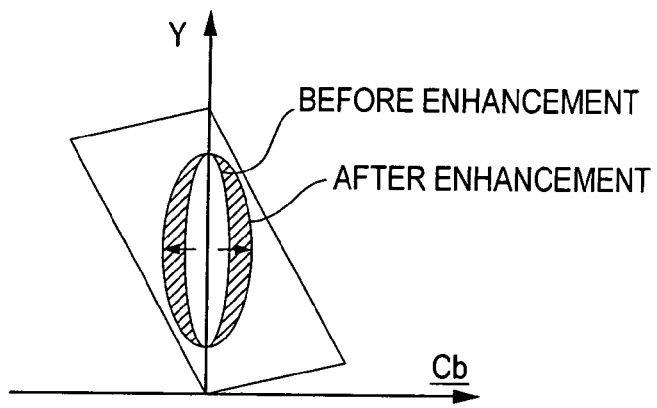
FIG. 2 shows a distribution of pixel values in a Y-Cb plane.
Figure 3:
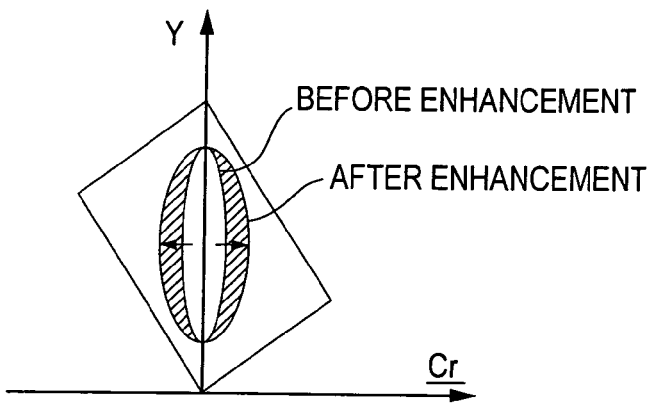
FIG. 3 shows a distribution of pixel values in a Y-Cr plane.

FIG. 1 shows a state where pixel values of an input image are distributed in a color space. As the color space, YCbCr color space is used. Y represents a brightness (luminance) component, and Cb, Cr represent color components. Since Cb and Cr are components indicating colors, as the absolute value becomes large, more vivid colors are obtained. FIG. 2 and FIG. 3 show distribution of the pixel values in a Y-Cb plane and a Y-Cr plane, respectively. The range of the pixel values is extended to the outside range along the arrow, in FIG. 2 and FIG. 3. In this case, since the absolute value of Cb, Cr increase, the color vividness is improved (that is, the saturation is enhanced).

Figure 4:
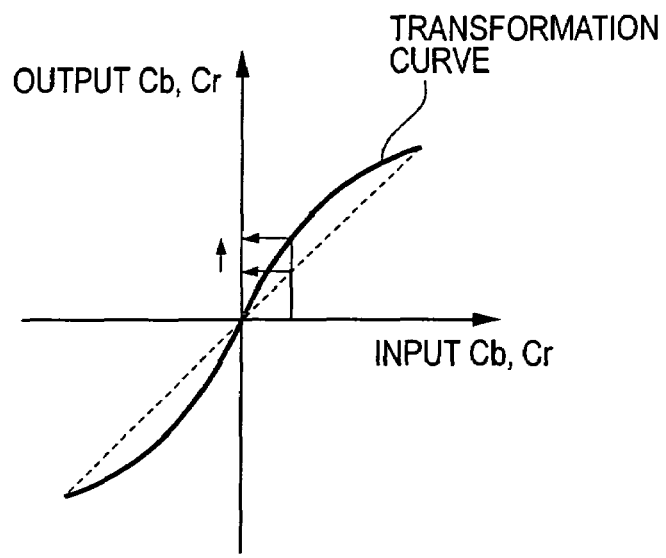
FIG. 4 shows change in the pixel values based on the transformation curve of the saturation.

The saturation enhancement can be substantially performed according to the transformation curve shown in FIG. 4. The transformation curve has an approximate S-shape, which passes through the origin, in which the horizontal axis is input, and the vertical axis is output. If the transformation of the pixel value of Cb, Cr is performed according to the transformation curve, it is possible to increase the absolute value.

Figure 5:
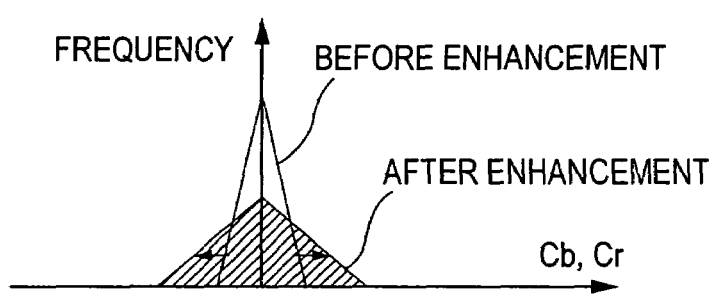
FIG. 5 shows change of the frequency distribution based on the transformation curve of the saturation.

The change in absolute value can be shown as change in the frequency distribution shown in FIG. 5. In FIG. 5, the horizontal axis represents pixel values of Cb (or Cr), and the vertical axis represents the frequency at the pixel values. The absolute value becomes large according to the transformation curve, and as a result, the frequency distribution extends to both sides thereof. Further, the frequency distribution changes according to the saturation enhancement, but the total number of pixels do not change. Since the frequency distribution shows the distribution of the color components, what the frequency distribution extends as shown in FIG. 5 means that the color enhancement is performed.

Figure 6:
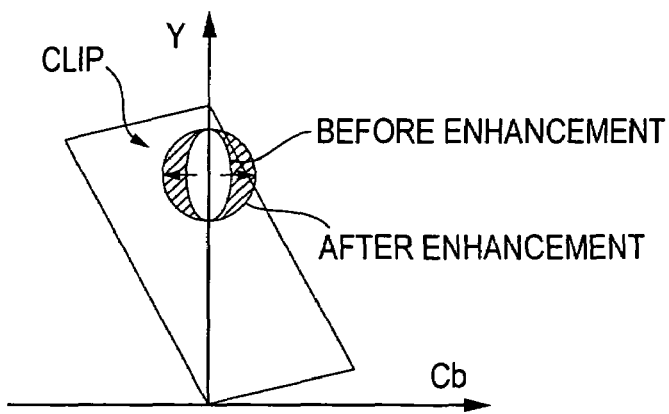
FIG. 6 shows change in pixel values of an image having a large brightness value.

FIG. 6 shows distribution of pixel values of another input image, viewed from Y-Cb plane. The characteristic of the input image is that the brightness value Y is relatively large. When the same transformation as before is performed on the image, the pixel value protrudes outside the color space. Since values outside the color space are not practically selected, a value on the boundary of the color space is taken (selected) (to take the value on the boundary is referred to that clip (cutting) is occurred at the boundary.

Figure 7:
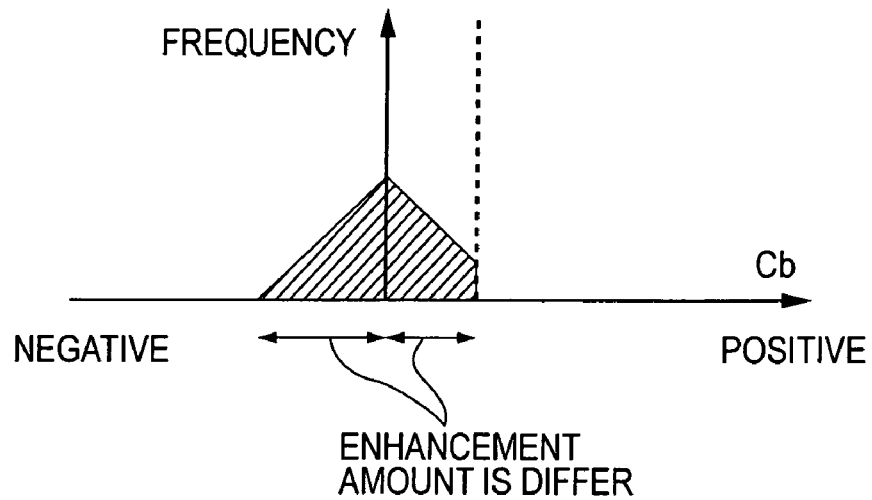
FIG. 7 shows a frequency distribution of a pixel value when a clip is occurred.

FIG. 7 shows a frequency distribution when the clip has occurred. As seen from Y-Cb plane shown in FIG. 2, in a region where the brightness is low, YCbCr color space is narrow in the positive direction of Cb, and is broad in the negative direction of Cb. Therefore, as shown in FIG. 6, most of clips generates in the positive region of Cb, the frequency distribution in the positive region of Cb is limited to a range having a fixed value. Specifically, since the color space in the negative region of Cb is broad, the clip can be difficult to occur, and thus the spread of the frequency distribution is large.

Further, as seen from the Y-Cr plane shown in FIG. 3, in a high-brightness region, the YCbCr space has a tendency to be narrow in the positive direction of Cr and in the negative direction of Cr, which is similar to that of Cb. However, as seen from comparing FIG. 2 to FIG. 3, in the high-brightness region, the positive region of Cr in the YCbCr color space does not so narrow as the positive region of Cb. Therefore, the above-mentioned clip does not matter in Y-Cr space as much as that in Y-Cb space.

In particular, when the brightness of the input image is significantly high as described above, spread of the frequency distribution is differentiated by the clipping. This leads to a difference in enhancing saturation for each color component so that the color balance when enhancing the saturation is collapsed. A positive direction of Cb corresponds to a blue color and a negative direction of Cb corresponds to a yellow. Therefore, specifically, the saturation is enhanced only for the negative direction of Cb. As a result, there occurs a problem in that a color balance in the yellow direction corresponding to the negative direction of Cb is collapsed.

Figure 8:
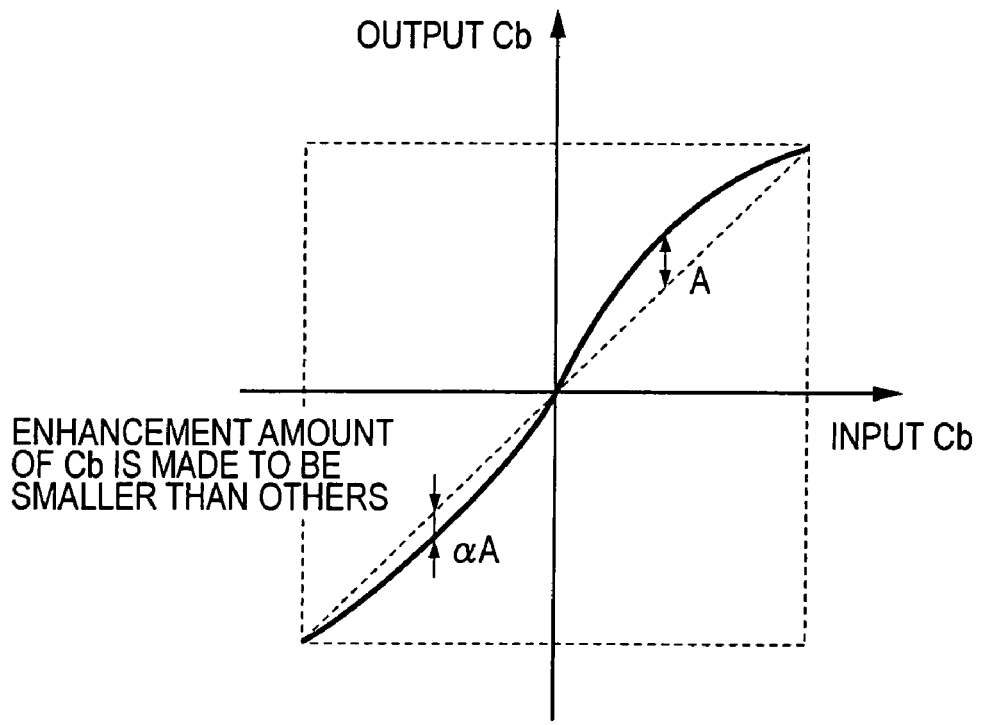
FIG. 8 shows an example of a transformation curve suppressing an enhancement amount of a Cb component.

Note that the color space in the negative direction of Cb is wide. Therefore, the saturation is highly enhanced. With respect to this, to solve the foregoing problems, the enhancement in the negative direction of Cb may be adjusted to be weaker than that for the other direction. FIG. 8 shows a modified transformation curve, which suppresses the enhancement amount in the negative direction of Cb. In FIG. 8, a coefficient α (0<α<1) (adjusting coefficient) is determined to suppress the enhancement amount in the negative direction of Cb larger than the normal value A or the enhancement amount in the positive direction of Cb.

Figure 9:
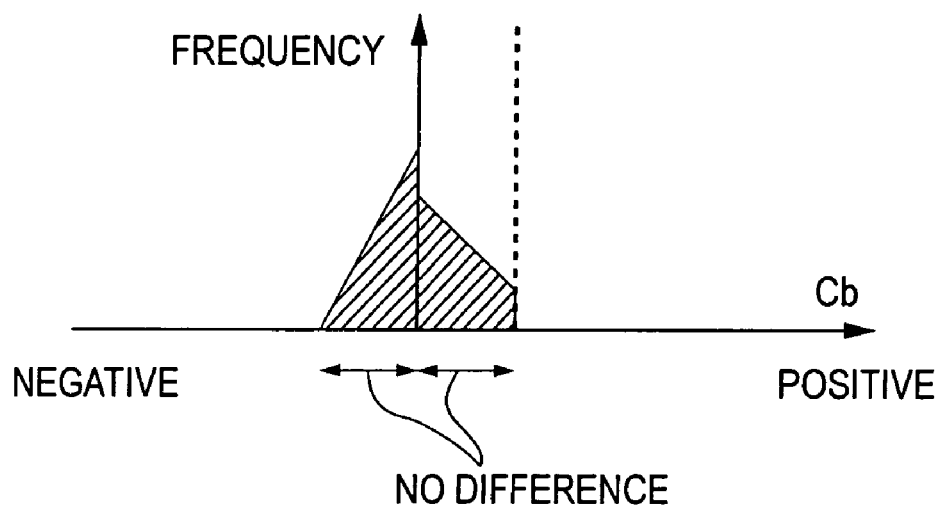
FIG. 9 shows a frequency distribution of a pixel value when the enhancement amount of the Cb component is suppressed.

FIG. 9 shows a frequency distribution when the saturation is enhanced using the transformation curve of FIG. 8. As described above, in the positive direction of Cb, the spread of the distribution due to the clip does not increase more than a constant value. However, in the negative direction of Cb, since the enhancement amount is suppressed due to the coefficient α introduced earlier as shown in FIG. 8, the spread of the distribution does not increase. As a result, the same level of saturation enhancement can be given both in the positive and negative directions, so that the color balance can be prevented from collapse.

In addition, the clip is generated in the positive direction of Cb for an image having a high brightness in particular, as shown in FIG. 6. Therefore, it is desirable that the indicated coefficient α (0<α<1) has a relation to the brightness value of the input image. In fact, since the brightness of the input image has a distribution, an average brightness is used as a representative value.

Figure 10:
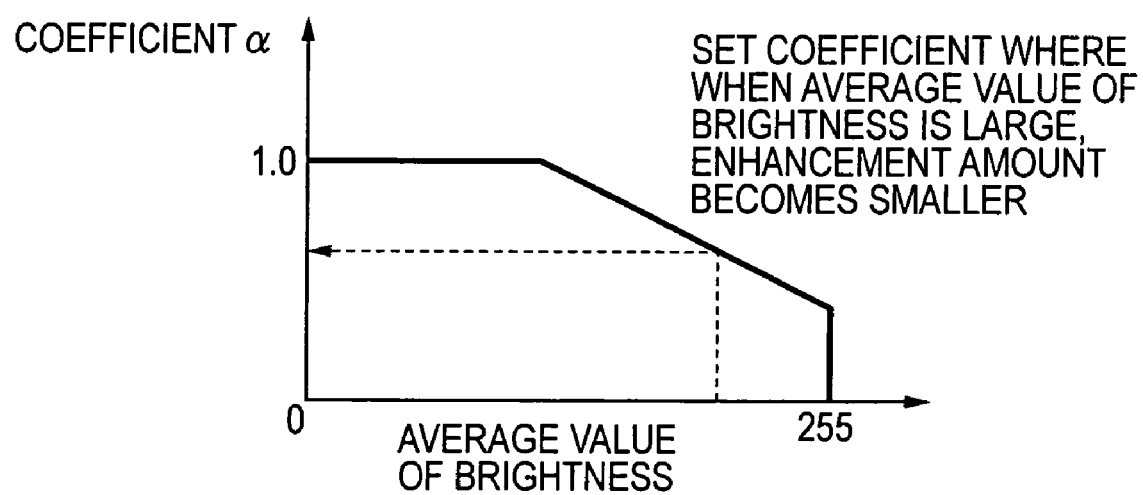
FIG. 10 shows an example of determining an adjusting parameter.

FIG. 10 shows a diagram for setting the coefficient α, by taking the average value of the brightness as a horizontal axis and the coefficient α as a vertical axis. As the average value of the brightness increases, the coefficient α is set to decrease.

Likewise, taking into account that a clip is generated in the positive direction of Cb at an area where the brightness is high due to a shape of the YCbCr space, the invention suppresses the enhancement amount in the negative direction of Cb. Thus, the color balance in the positive and negative directions of Cb can be adjusted and the natural saturation enhancement is achieved.

Figure 11A:
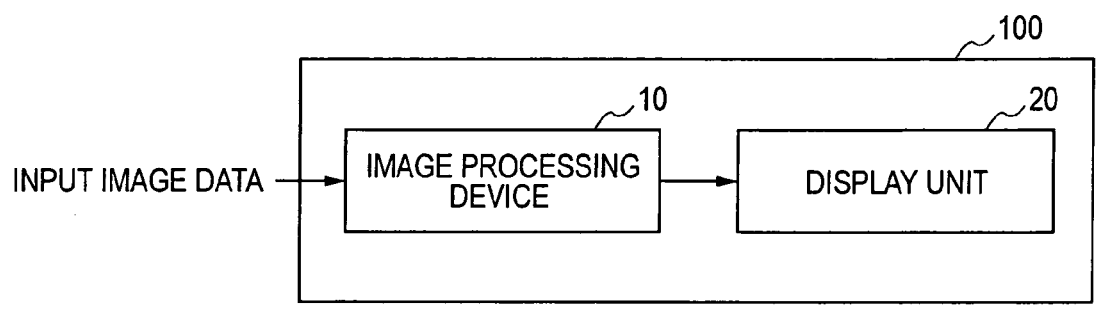
FIG. 11 is an exemplary block diagram showing a schematic arrangement of an image display device of the invention.

Next, an image display device using a saturation correcting processing according to an exemplary embodiment of the invention will be described. FIG. 11A shows an exemplary schematic diagram of an image display device 100. The image display device 100 may be a device for processing and displaying an external input image data, an AV appliance or a terminal having an image display function. In addition, the saturation correcting process of the invention can be characterized in a smaller amount of calculation. Thus, the invention can be particularly suitable for a portable terminal device, such as a mobile phone or a PDA, which have such amount of processing capacity.

Figure 11B:
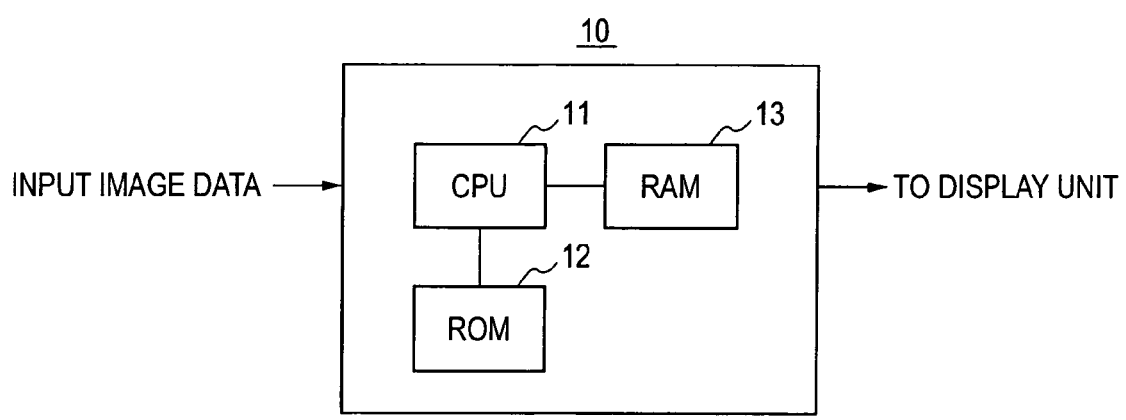

The image display device 100 can include an image processing device 10 for performing an image process including a saturation correction process and a display unit 20 for displaying the processed image. The image processing device 10 may include a CPU 11, a ROM 12 for storing an image processing program, and a RAM 13 as an operating memory, as shown in FIG. 11B. In this case, the saturation correcting process according to the present invention may be performed is such a manner that the process is stored in the ROM 12 as an image process program and the CPU 11 reads the program. Further, the image process including the saturation correcting process is not performed in software but may be performed by processing a part or all of the process in hardware.

The display unit 20 may be a type of the image display device 100. Alternatively, a liquid crystal panel and other flat panel display can also be used as the display unit 20.

Next, the saturation correcting process according to the first exemplary embodiment will be described. In the first embodiment of the invention, the enhancement amount in the negative region of the Cb component in the YCbCr space as described is suppressed so that the favorable saturation correction with a satisfactory color balance can be performed.

FIG. 12 shows a flow chart of a saturation correcting process according to the first exemplary embodiment of the invention. The saturation correcting process of the first embodiment can be performed by calculating a statistic amount of input image data, extracting features of the input image data, making a correction table based on the extracted features, and correcting the saturation of the input image data by using the correction table.

Specifically, the input image data is sampled to make a histogram (step S1). In general, since the input image data is given as an RGB frame image data, the image processing device 10 can convert the RGB input image data (including R, G, and B) into the YCbCr input image data (including Y, Cb, and Cr) according to equations 1 and 2 below.

[Equation 1]

$$\begin{pmatrix} Y \\ Cb \\ Cr \end{pmatrix} = M \begin{pmatrix} R \\ G \\ B \end{pmatrix} \quad (1)$$

[Equation 2]

$$M = \begin{pmatrix} 0.2990 & 0.5870 & 0.1140 \\ -0.1687 & -0.3313 & 0.5000 \\ 0.5000 & -0.4187 & -0.0813 \end{pmatrix} \quad (2)$$

Equation 1 can be used to convert the RGB-type image data into the YCbCr-type image data, and equation 2 is a transformation matrix M thereof.

Figure 13A:
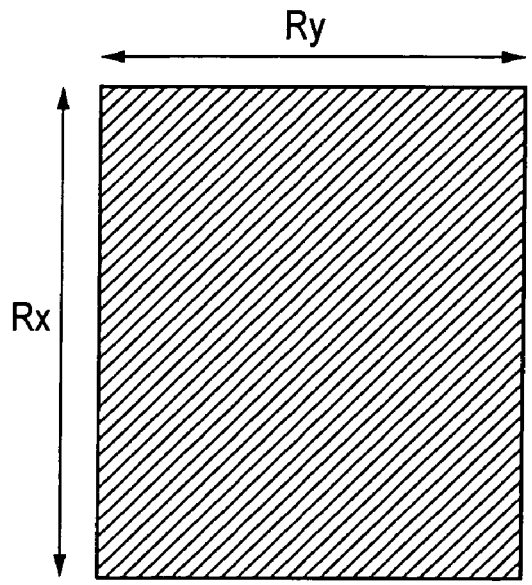
FIG. 13 is a diagram illustrating a sampling region.
Figure 13B:
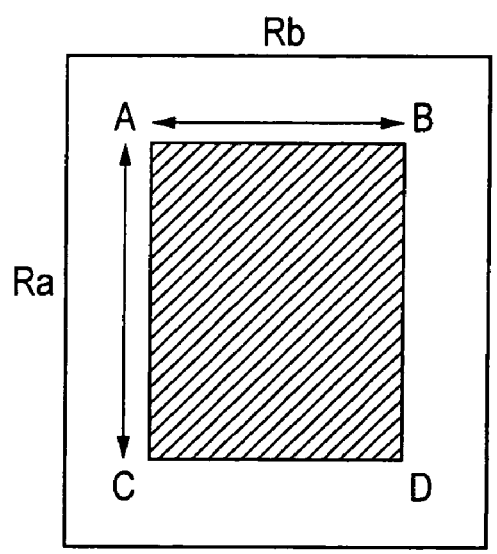

When the YCbCr-type input data is obtained, the image processing device 10 samples the YCbCr-type input data, extracts images included in the frame image, and makes the histogram. FIGS. 13A and 13B show examples of the sampling region where the images are extracted by sampling. In FIG. 13A, entire frame image becomes the sampling region. Here, when the horizontal and vertical sizes represented by Rx and Ry, a total frequency due to the sampling is a total pixel number Rx×Ry.

FIG. 13B is an example of a sampling region only for a central area of the frame image. Assuming the horizontal and vertical sizes of the image are Rx and Ry and a ratio of the central area to the overall image is R, the horizontal and vertical sizes of the central area Ra and Rb can be found as shown in equation 3.

[Equation 3]

$$R_a = \sqrt{R} R_x, \quad R_b = \sqrt{R} R_y \quad (3)$$

In addition, coordinates of peaks A to D of the central area shown in FIG. 13B are given by the following equation 4.

[Equation 4]

$$A: \left(\frac{R_x - R_a}{2}, \frac{R_y - R_b}{2}\right) \quad B: \left(\frac{R_x + R_a}{2}, \frac{R_y - R_b}{2}\right) \quad (4)$$

$$C: \left(\frac{R_x - R_a}{2}, \frac{R_y + R_b}{2}\right) \quad D: \left(\frac{R_x + R_a}{2}, \frac{R_y + R_b}{2}\right)$$

From this area, a histogram $f_A(k)$ of the brightness Y and the histogram $f_S(k)$ of the saturation S can be drawn as the following equation 5.

[Equation 5]

$$f_A(k), k=0,\ldots,255$$

$$f_S(k), k=0,\ldots,128 \quad (5)$$

Here, the saturation S can be found from the color difference signals Cb and Cr, as described in equation 6.

[Equation 6]

$$S = \{|C_b| + |C_r|\}/2 \quad (6)$$

Figure 14:
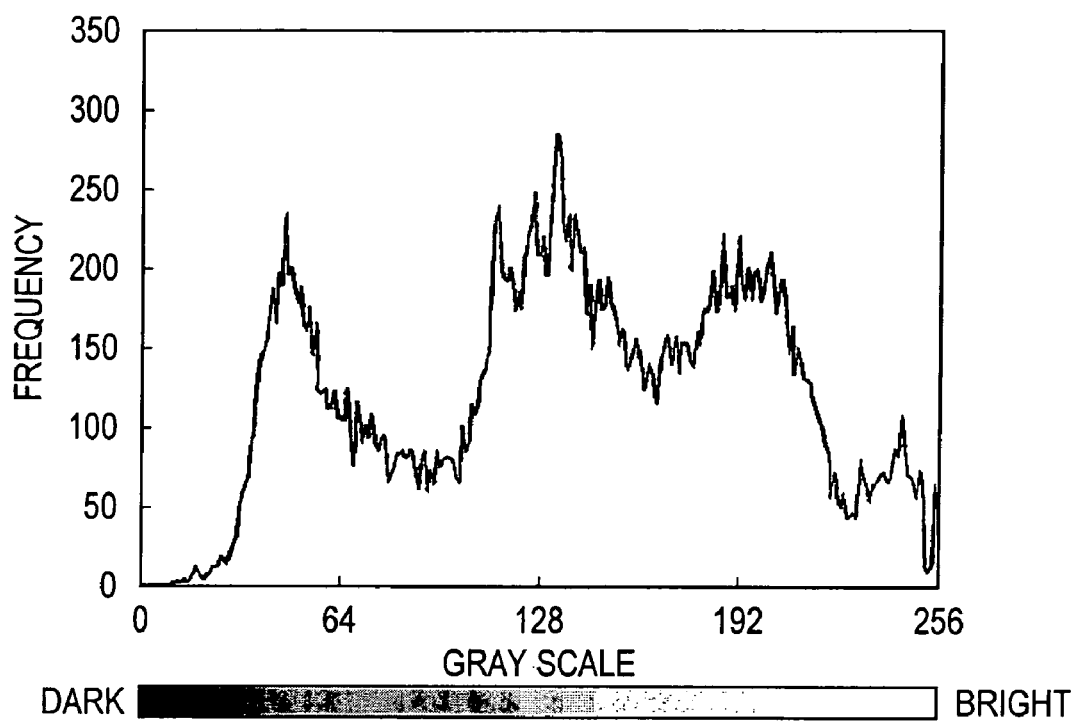
FIG. 14 is an example of a histogram for brightness.

FIG. 14 shows an example of the histogram obtained from the above description. The horizontal axis refers to gray level scale levels (0 to 255) and the vertical axis refers to a frequency (pixel number having each gray level scale level). Similarly, the histogram for the saturation S can be drawn.

Next, using the obtained histogram, the statistic amount can be calculated (step S2). Specifically, the average values $P_{Aave}$ and $P_{Save}$ are calculated from the histogram $f_A(k)$ of the brightness Y and the histogram $f_S(k)$ of the saturation S according to equation 7, respectively.

[Equation 7]

$$P_{Aave} = \sum_{k=0}^{255} k f_A(k)/(R_a R_b) \quad (7)$$

$$P_{Save} = \sum_{k=0}^{128} k f_S(k)/(R_a R_b)$$

Next, a correcting parameter used in the saturation correction can be calculated based on the obtained statistic amount (step S3). Specifically, using the saturation average value $P_{Save}$, a saturation enhancement amount $P_{Sdiff}'$ is calculated according to equation 8.

[Equation 8]

$$P'_{Sdiff} = \begin{cases} P_{Sdiff}, & P_{Sdiff} \le P_{Sth} \\ P_{Sth}, & P_{Sdiff} > P_{Sth} \end{cases} \quad (8)$$

$$P_{Sdiff} = \begin{cases} (P_{Saveth} - P_{Save})P_{Scv1}/P_{Scv2}, & P_{Save} < P_{Saveth} \\ 0, & P_{Save} \ge P_{Saveth} \end{cases}$$

Figure 15:
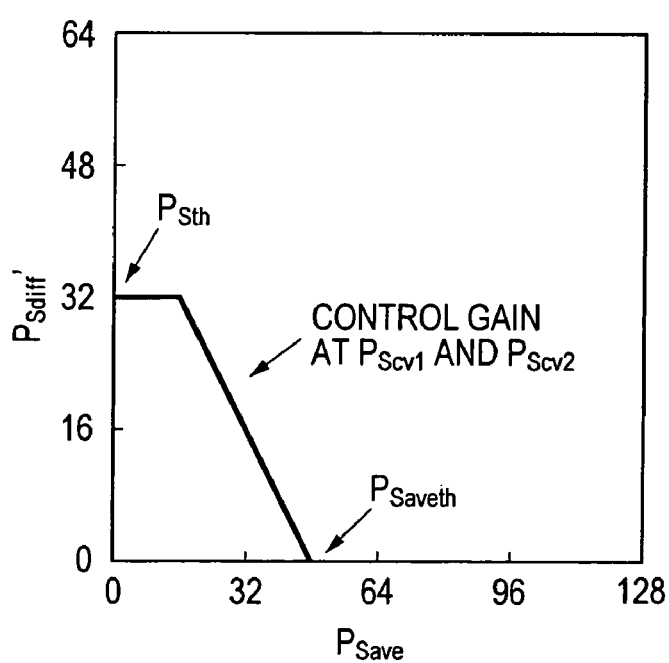
FIG. 15 is a graph showing an example of calculating a saturation enhancement amount.

Here, $P_{Saveth}$ is a reference value for correction, $P_{Scv1}$ and $P_{Scv2}$ are parameters for adjusting correcting amount, and $P_{Sth}$ is a limiter for limiting the correcting amount. FIG. 15 shows a relationship between the saturation average value $P_{Save}$ and the acquired saturation enhancement amount $P_{Sdiff}'$. As shown in FIG. 15, when the saturation average value $P_{Save}$ is small, the saturation enhancement amount $P_{Sdiff}'$ is set to be large, and as the saturation average value $P_{Save}$ exceeds the predetermined value, the saturation enhancement amount $P_{Sdiff}'$ is set to 0 (that is, no enhancement). Accordingly, the region having a lower saturation can be enhanced.

Figure 16A:
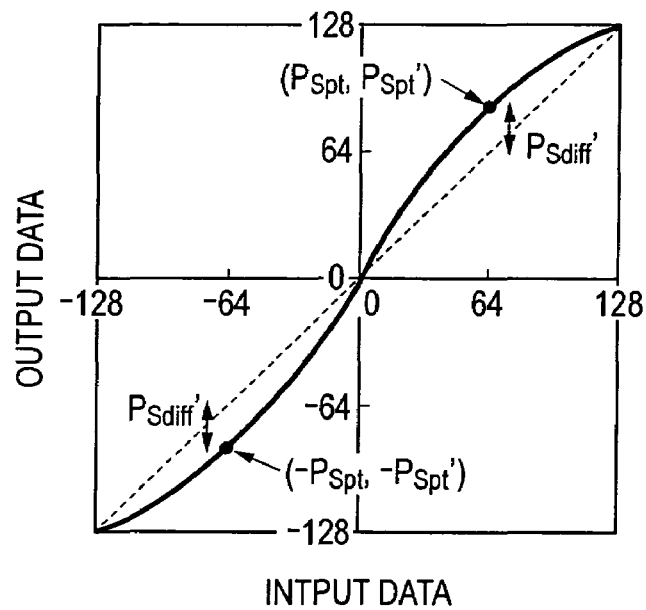
FIG. 16 is an example of a saturation correction table.

When the correcting parameter is acquired, a correction table is calculated based on the adjusting parameter (step S4). FIG. 16A shows an example of the correction table S[Cr], which has a Cr component. The correction table S[Cr] is made as a curve passing (0,0), (−128, −128), (128, 128), a correction point 1($P_{Spt}$, $P_{Spt}'$), and a correction point 2(−$P_{Spt}$, −$P_{Spt}'$). A proper interpolation function such as a spline interpolation is used to make a curve. The correction points 1 and 2 are symmetric to the original point, and the correction table S[Cr] is also symmetric to the original point. The output of the correction point $P_{Spt}'$ can be found using the input $P_{Spt}$ and the saturation enhancement amount $P_{Sdiff}'$ as the following equation 9.

[Equation 9]

$$P_{Spt}' = P_{Spt} + P_{Sdiff}'$$

$$P_{Spt}'' = P_{Spt} + P_{Sdiff}' \cdot \alpha_S \quad (9)$$

In the correction table C[Cr] shown in FIG. 16A, the same saturation enhancement amount $P_{Sdiff}'$ can be used for the positive and negative regions of the input data. However, when the correction table S[Cb] having a color component Cb is similarly configured, for a case where the brightness of the input image data is high as described above, if the Cb component is clipped in the positive region, the negative region of the Cb component becomes relatively strong so that the color balance is collapsed. Therefore, according to the present invention, an adjusting parameter α is introduced in the negative region of the correction table S[Cb] and the saturation enhancement amount is $P_{Sdiff}' \cdot \alpha_S$.

Figure 16B:
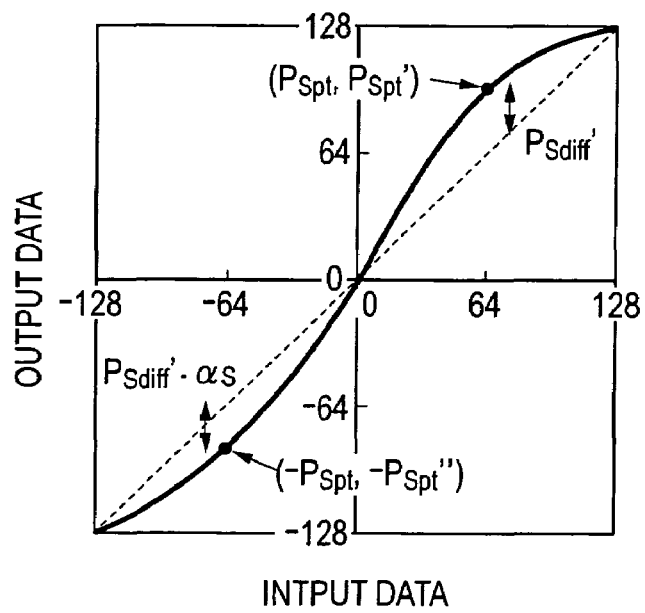

Regarding this, FIG. 16B shows an example of the correction table S[Cb]. In addition, the output of the correction point $P_{Spt}'$ herein can be obtained using the input $P_{Spt}$, the saturation enhancement amount $P_{Sdiff}'$, and the adjusting parameter $\alpha_S$ as shown in equation 9. The adjusting parameter $\alpha_S$ is $0<\alpha_S<1$, so that the enhancement amount of the negative region of the Cb component of the correction table is smaller than the enhancement amount of the positive region, as shown in FIG. 16B. Therefore, the enhancement of the negative region of the Cb component can be further suppressed compared with the enhancement of other color components so that the color balance can be prevented from collapse.

Next, using the correction tables S[Cb] and S[Cr] configured as described above, the color is corrected (step S5). The tone correction is performed for each pixel of the input image data. Specifically, the corrected image data Y', Cb', and Cr' are obtained according to equation 10 by using the correction table S[Cb] and S[Cr], and converted into the RGB type image data R', G' and B'. In addition, according to the exemplary embodiment, the brightness Y is not corrected. Thus, the saturation correcting process is completed.

[Equation 10]

$$Y' = Y$$
$$Cb' = S_1[Cb]$$
$$Cr' = S_2[Cr]$$
$$\begin{pmatrix} R' \\ G' \\ B' \end{pmatrix} = M^{-1} \begin{pmatrix} Y' \\ Cb' \\ Cr' \end{pmatrix} \quad (10)$$

Figure 17:
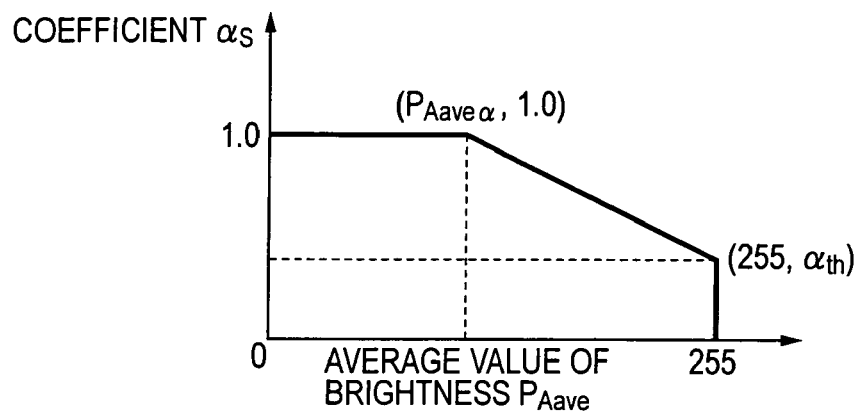
FIG. 17 shows an example of determining the adjusting parameter according to the first exemplary embodiment of the invention.

Next, the adjusting parameter $\alpha_S$ will be described. FIG. 17 shows an example of a graph of $\alpha_S$. Here, the horizontal axis represents a brightness average value $P_{Aave}$, which shows that the adjusting parameter $\alpha_S$ is reduced when the brightness average value $P_{Aave}$ exceeds the predetermined value. Accordingly, when the brightness of the input image data is high, the enhancement in the negative region of the Cb component is suppressed to prevent the yellow from being enhanced too much. The value of $\alpha_S$ in FIG. 17 can be obtained from equation 11. In addition, while the adjusting parameter $\alpha_S$ is linearly reduced (monotonically reduced) from a point where the brightness average value $P_{Aave}$ exceeds the predetermined value, in the example of FIG. 17, the adjusting parameter $\alpha_S$ may be non-linearly reduced (logarithmically reduced).

[Equation 11]

$$\alpha_S = \begin{cases} 1.0, & P_{Aave} < P_{Aave\alpha} \\ a_\alpha P_{Aave} + b_\alpha, & P_{Aave} \geq P_{Aave\alpha} \end{cases} \quad (11)$$

$$a_\alpha = \frac{\alpha_{th} - 1}{255 - P_{Aave\alpha}} \quad b_\alpha = 1.0 - a_\alpha P_{Aave\alpha}$$

Next, the second exemplary embodiment of the invention will be described. The case where only the saturation is corrected as a tone correction processing has been described in the first embodiment of the present invention. On the contrary, according to the second exemplary embodiment of the present invention, the brightness in addition to the saturation is corrected at the same time. However, the method of correcting saturation is the same as that described in the first exemplary embodiment.

Figure 18:
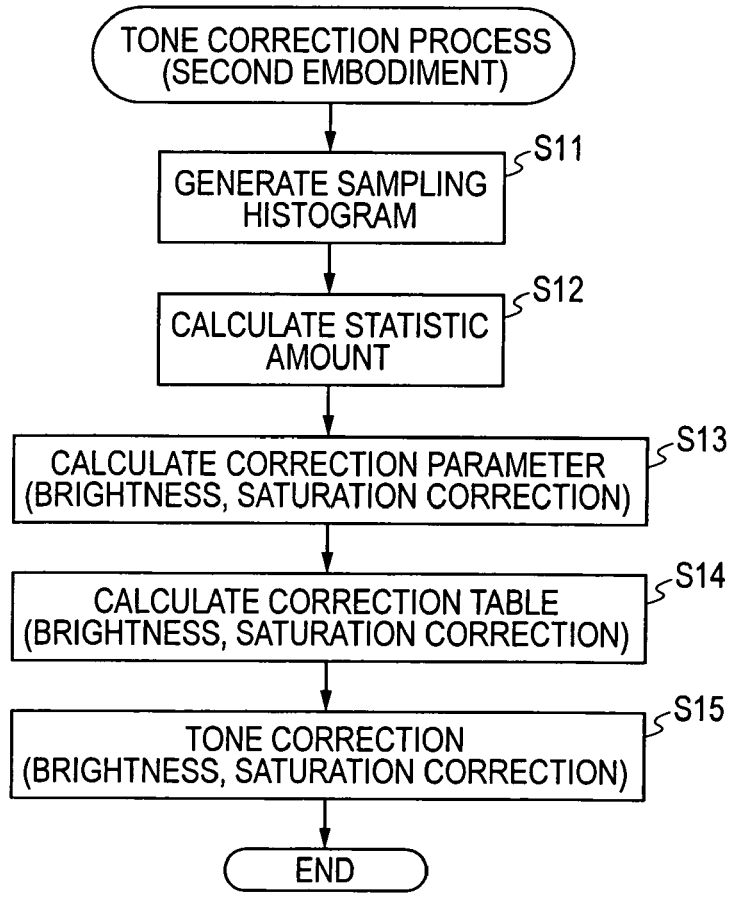
FIG. 18 is a flow chart of a tone correction process according to the second exemplary embodiment of the invention.

FIG. 18 is a flowchart of the tone correction process according to the second exemplary embodiment of the invention. Similar to the first embodiment, first, the input image data is sampled to obtain a histogram over the brightness Y and the saturation S (step S11). Based on the histogram, the statistic amount of the brightness Y and the saturation S are calculated (step S12).

Figure 19:
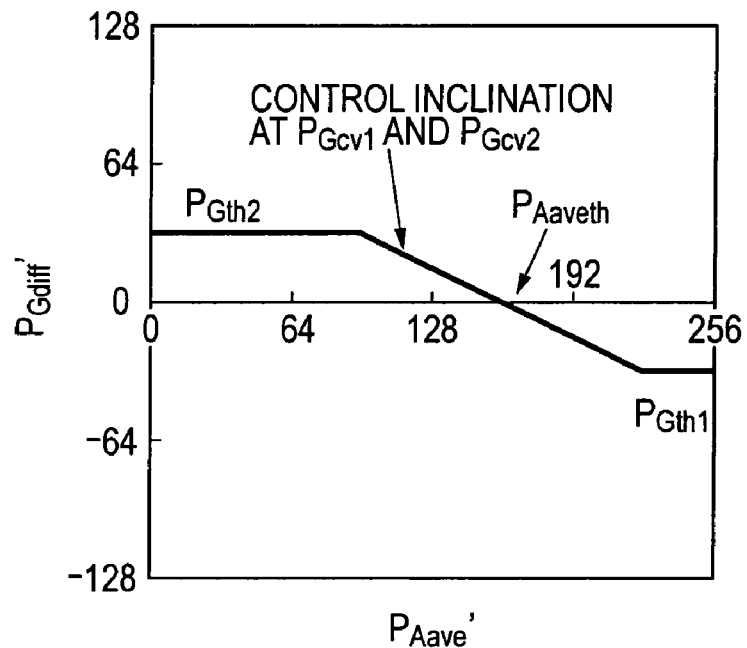
FIG. 19 is an example of calculating an amount of brightness correction.

Next, based on the statistic amount, the adjusting parameter is calculated (step S13). Here, the correcting parameter $P_{Sdiff}'$ of the saturation S is shown in FIG. 15, which can be obtained from equation 8, similar to the first embodiment. However, the correcting parameter (gamma adjusting parameter) $P_{Gdiff}'$ of the brightness Y can be obtained from equation 12, as shown in FIG. 19. FIG. 19 shows a relation between the average value $P_{Aave}'$ and the correcting parameter $P_{Gdiff}'$.

[Equation 12]

$$P'_{Gdiff} = \begin{cases} P_{Gth1}, & P_{Gdiff} < P_{Gth1} \\ P_{Gdiff}, & P_{Gth1} \leq P_{Gdiff} \leq P_{Gth2} \\ P_{Gth2}, & P_{Gth2} < P_{Gdiff} \end{cases} \quad (12)$$

$$P_{Gdiff} = (P_{Aaveth} - P'_{Aave})P_{Gcv1} / P_{Gcv2}$$

Here, $P_{Gaveth}$ is a reference value of the correction, $P_{Gcv1}$ and $P_{Gcv2}$ are parameters for adjusting the correction amount, and $P_{Gth1}$ and $P_{Gth2}$ are limiters for limiting the correction amount. The reference value of the correction $P_{Gaveth}$ is determined such that the correction for darkening the brightness is used when the average value $P_{Aave}'$ becomes larger than the reference value of the correction $P_{Gaveth}$ while the correction for brightening the brightness is used when the average value $P_{Aave}'$ is smaller than the reference value of the correction $P_{Gaveth}$.

Figure 20:
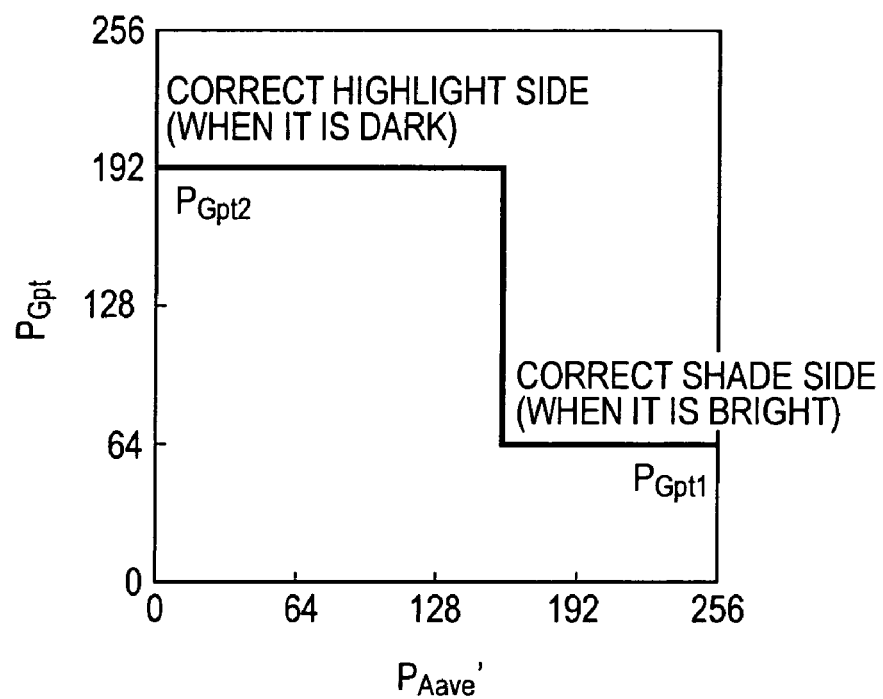
FIG. 20 is an example of determining a brightness correction point.

Next, the correction table is calculated based on the adjusting parameter of the brightness Y and the saturation S (step S14). The correction table of the saturation S is configured in the same manner as the first embodiment. However, the correction point $P_{Gpt}$ of the brightness Y is given as the following equation 13, as shown in FIG. 20.

[Equation 13]

$$P_{Gpt} = \begin{cases} P_{Gpt2}, & P'_{Aave} < P_{Aaveth} \\ P_{Gpt1}, & P'_{Aave} \geq P_{Aaveth} \end{cases} \quad (13)$$

Figure 21:
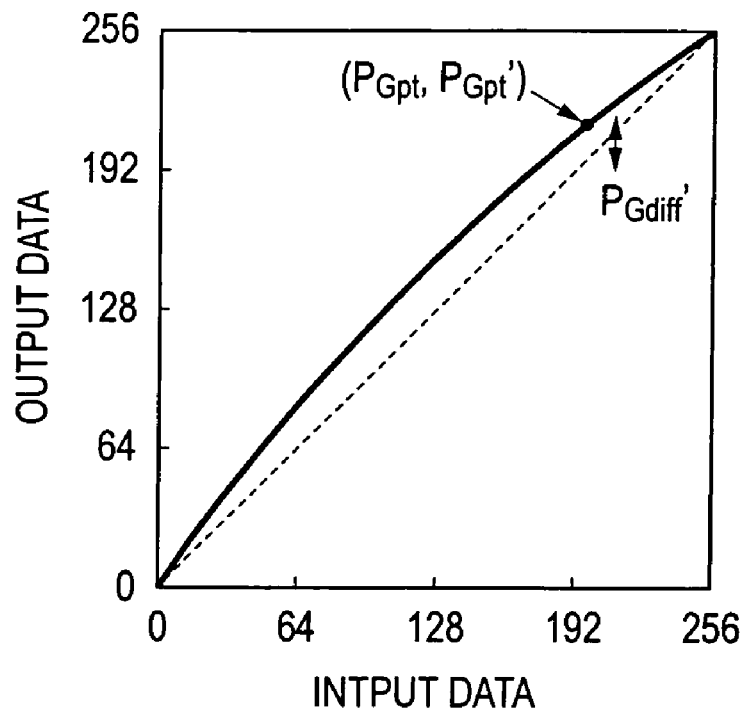
FIG. 21 is an example of a brightness correction table.

By using equation 13, when the average value $P_{Aave}'$ becomes larger than the reference value of the correction $P_{Gaveth}$, i.e., when the brightness is darkened, the correction point is set to be small ($P_{Gpt1}$). On the contrary, when the brightness is brightened, the correction point is set to be large ($P_{Gpt2}$). Using this correction point, the correction table (gamma correction table) $Y_{gamma}[Y]$ of the brightness Y can be obtained as shown in FIG. 21, by equation 14.

[Equation 14]

$$P_{Gpt}' = P_{Gpt} + P_{Gdiff}' \quad (14)$$

Next, the tone is corrected using the correction table for the brightness Y and the saturation S (step S15). Specifically, the corrected brightness Y', and the color differences Cb' and Cr' are calculated according to equation 15, and converted into the RGB-type image data R', G', and B'.

[Equation 15]

$$Y' = Y_{gamma}[Y]$$
$$Cb' = S_1[Cb]$$
$$Cr' = S_2[Cr]$$

$$\begin{pmatrix} R' \\ G' \\ B' \end{pmatrix} = M^{-1} \begin{pmatrix} Y' \\ Cb' \\ Cr' \end{pmatrix} \quad (15)$$

Thus, the tone correction including the correction of the brightness and saturation is finally completed.

Figure 22:
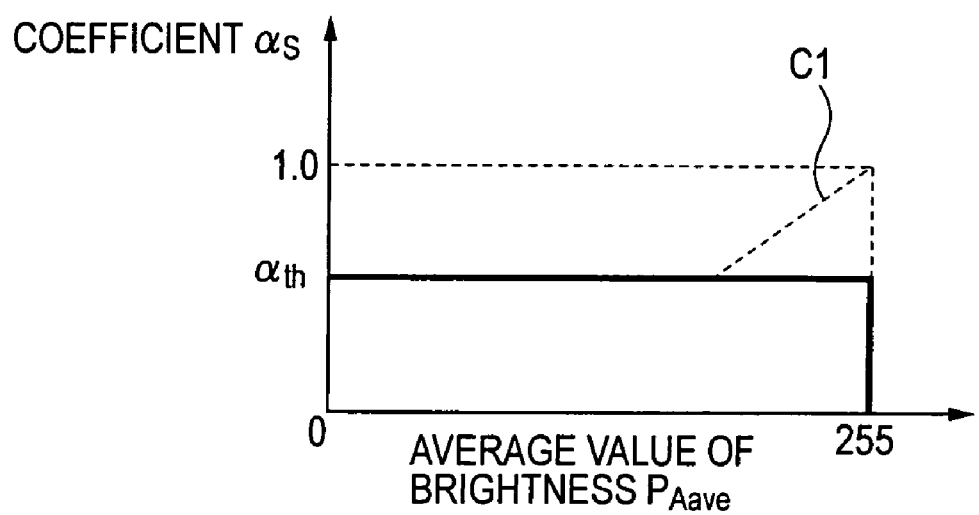
FIG. 22 shows an example of determining the adjusting parameter according to the second exemplary embodiment of the invention.

An example of the adjusting parameter $\alpha_S$ of the saturation correction table according to the second exemplary embodiment of the invention will be described in equation 16 and shown in FIGS. 21 and 22.

[Equation 16]

$$\alpha_S = \alpha_{th} \quad (16)$$

In the first exemplary embodiment, the adjusting parameter $\alpha_S$ is gradually reduced to more than the predetermined average value of the brightness $P_{Aave}'$, as shown in FIG. 17. According to an exemplary example of the second exemplary embodiment, the adjusting parameter $\alpha_S$ is fixed to the predetermined value $\alpha_{th}$, as shown in FIG. 22. In the second exemplary embodiment, the brightness as well as the saturation is corrected. Here, when the average value of the brightness $P_{Aave}'$ is small, i.e., when the image is dark, the correction to brighten the image is performed. In the first exemplary embodiment of FIG. 17, when the average value of the brightness $P_{Aave}'$ is small, the clip is hardly generated so that the adjusting parameter $\alpha_S$ is set to be 1. However, in the second exemplary embodiment, the correction to brighten image is performed on the dark image by the brightness correction, so that the color component Cb may probably be clipped in the positive direction by using the saturation correction. Here, according to the second exemplary embodiment performing correction of the brightness Y, the adjusting parameter $\alpha_S$ is fixed to the predetermined value $\alpha_{th}$ ($0<\alpha_{th}<1$). Thus, the color is preferably balanced such that the color component of the negative region of the Cb (i.e., yellow component) is further suppressed. In addition, as another example, the adjusting parameter $\alpha_S$ may be gradually increased from the predetermined value $\alpha_{th}$ in the region above the predetermined average value of the brightness $P_{Aave}$ as shown by a broken line C1 in FIG. 22. For example, when the average value of the brightness $P_{Aave}$ is large, i.e., when the image is bright, the correction is performed on the dark image. As a result, the chance that the color component Cb is clipped in the positive direction due to the saturation correction is reduced.

Next, a third exemplary embodiment of the invention will be described. In the third exemplary embodiment, when the input image data is moving image data, the scene change is detected to update the adjusting parameter $\alpha_S$. In general, when the brightness correction or the saturation correction is performed on the moving image data, the correcting parameter at the time when the scene (situation) is significantly changed is used (dynamically update the correcting parameter). However, when the scene is not significantly changed, the same parameter is preferably used (the adjusting parameter is not dynamically updated) to prevent flickering. For this reason, the adjusting parameter $\alpha_S$ of the saturation correction is updated according to the detection result of the scene change. Specifically, the weighted average of the adjusting parameter for continuous moving image frame is found, and the weight of the weighted average is adjusted according to the detection result of the scene change.

Here, assume that the adjusting parameter for the previous frame image is $\alpha_{S0}$ and the adjusting parameter of the current frame image is $\alpha_{S1}$, the weighted adjusting parameter $\alpha$ can be represented as follows.

[Equation 17]

$$\alpha = W_{pre} \cdot \alpha_{S0} + W_{now} \cdot \alpha_{S1}$$

where, $W_{pre}$ and $W_{now}$ refer to weights of the adjusting parameter for the previous and current frame images, and $W_{pre} + W_{now} = 1$.

Here, when the scene is significantly changed, for example, the weights is determined as $W_{pre}=0$ and $W_{now}=1$. With the determination of the weights, the adjusting parameter $\alpha$ after calculating the weighted average based on equation 17 becomes the adjusting parameter for the current frame image $\alpha_{S1}$ so that the adjusting parameter at that point is updated. As a result, the correction optimal to the scene change can be performed.

Further, when the scene is large and unchanged, the weights are determined as $W_{pre}=W_{now}=0.5$. With the determination of the weights, the adjusting parameter $\alpha$ after calculating the weighted average is simply averaged by equation 17, so that a temporal minute change of the adjusting parameter can be removed. As a result, the disturbance, such as flickering after the correction, can be reduced. In addition, while the invention has been described in the context of detecting whether the scene is changed, it is also possible to calculate the degree of the scene change and successively control the weights of the weighted average according to the degree of change.

Likewise, when the input image data is moving image data, the scene change is detected, and the weighted average of the saturation adjusting parameter $\alpha$ can be obtained according to the detection result of the scene change. Therefore, even when the input image data is the moving image, the proper saturation correction can be performed.

FIG. 23 shows a flowchart of an exemplary tone correction processing according to the third embodiment of the invention. Further, while only the saturation correction is performed as a tone correction in the third embodiment, which is similar to the first embodiment, the third exemplary embodiment can also be used for correcting the brightness as well as the saturation, as described in the second exemplary embodiment.

In FIG. 23, steps S21 to S23 are the same as the steps S1 to S3 of the first embodiment. Further, the input image data, which is a moving image in this example, is sampled for each frame image to make the histogram (step 21). Next, the statistic amount is calculated (step S22) and the correction parameter is calculated (step S23).

Next, the processing of changing scenes is performed (step S24). In other words, the scene change is detected and the afore-mentioned weighted $W_{pre}$ and $W_{now}$ are calculated according to the detection result of the scene change. Further, the adjusting parameter $\alpha$ is calculated according to equation 17. In addition, the scene change is determined that it was changed when the difference of the brightness averages of the previous and current frame images exceeds the predetermined value. Here, the method of detecting the scene change is well known to those skilled in the art so that the description thereof will be omitted.

From the detection result of the scene change, when the adjusting parameter $\alpha$ can be obtained, the correction table is configured based on the adjusting parameter (step S25), and the tone correction is performed according to the correction table (step S26).

While this invention has been described in conjunction with the specific embodiments thereof, it is evident that many alternatives, modifications, and variations will be apparent to those skilled in the art. Accordingly, preferred embodiments of the invention as set forth herein are intended to be illustrative, not limiting. There are changes that may be made without departing from the spirit and scope of the invention.

What is claimed is:

1. An image processing device, comprising:
a saturation-enhancement-amount determining device that determines a saturation enhancement amount by extracting saturation information from input image data;
a color component extracting device that extracts from the input image data a plurality of color components having saturation to be enhanced;
a saturation enhancing device that enhances, based on the saturation enhancement amount determined by the saturation-enhancement-amount determining device, the saturations of the plurality of color component extracted by the color component extracting device; and
an enhancement-amount adjusting device that adjusts the determined saturation enhancement amount determined by the saturation-enhancement-amount determining device, such that a color balance in a positive and a negative region of a color space is adjusted, when the saturation enhancing device enhances a saturation of a predetermined color component among the plurality of color components and such that an enhancement amount of the predetermined color component in the negative region of the color space is smaller than an enhancement amount in the positive region thereof, the predetermined color component in the color space being a Cb color component in a YCbCr color space, and an adjusting degree for an enhancement amount in a positive region of the Cb color component being greater than an adjusting degree for an enhancement amount in a negative region of the Cb color component of the YCbCr color space.

2. The image processing device according to claim 1, further comprising:
a brightness information extracting device that extracts from the input image data brightness information; and
the enhancement-amount adjusting device adjusting the saturation enhancement amount based on the extracted brightness information.

3. The image processing device according to claim 2, when the brightness from the extracted brightness information is high, the enhancement-amount adjusting device reducing the saturation enhancement amount.

4. The image processing device according to claim 2, the enhancement-amount adjusting device making the enhancement amount of the predetermined color component in the negative region be equal to an enhancement amount in the positive region multiplied by a coefficient $\alpha(0<\alpha<1)$.

5. The image processing device according to claim 4, the coefficient $\alpha$ being a fixed value when a average value of the brightness information is smaller than a predetermined value, and the coefficient $\alpha$ being decreased from the fixed value as the average value of the brightness information becomes larger than the predetermined value.

6. The image processing device according to claim 4, further comprising:
a brightness correcting device that corrects a brightness component of the input image data based on the extracted brightness information; and
the coefficient $\alpha$ being a fixed value irrespective of the brightness information.

7. The image processing device according to claim 4, the input image data being moving image data having a plurality of frame image data;
the image processing device further including a scene-change detecting device that generates a control signal according to the degree of scene change of the moving image data; and
the enhancement-amount adjusting device weighing the coefficient $\alpha$ corresponding to the plurality of frame image data based on the control signal to calculate the coefficient $\alpha$ in the corresponding frame image data.

8. An image display device, comprising:
the image processing device according to claim 1; and
a display unit that displays an image outputted from the image processing device.

9. An image processing method to be implemented by an image processing apparatus, comprising:
determining a saturation enhancement amount by extracting saturation information from input image data;
extracting from the input image data a plurality of color components having saturation to be enhanced;
enhancing the saturations of the plurality of color components based on the determined saturation enhancement amount; and
adjusting the determined saturation enhancement amount, such that a color balance in a positive and a negative region of a color space is adjusted, when enhancing is being performed on a saturation of a predetermined color component among the plurality of color components and such that an enhancement amount of the predetermined color component in the negative region of the color space is smaller than an enhancement amount in the positive region thereof, the predetermined color component in the color space being a Cb color component in a YCbCr color space, and an adjusting degree for an enhancement amount in a positive region of the Cb color component being greater than an adjusting degree for an enhancement amount in a negative region of the Cb color component of the YCbCr color space.

10. An image processing program stored on a computer readable medium and executed by a computer that allows the computer to function as:
a saturation-enhancement-amount determining device that determines a saturation enhancement amount by extracting saturation information from input image data;
a color component extracting device that extracts from the input image data a plurality of color components having saturation to be enhanced;
a saturation enhancing device that enhances, based on the saturation enhancement amount determined by the saturation-enhancement-amount determining device, the saturation of the color component extracted by the color component extracting device; and
an enhancement-amount adjusting device that adjusts the determined saturation enhancement amount determined by the saturation-enhancement-amount determining device, such that a color balance in a positive and a negative region of a color space is adjusted, when the saturation enhancing device enhances a saturation of a predetermined color component among the plurality of color components and such that an enhancement amount of the predetermined color component in the negative region of the color space is smaller than an enhancement amount in the positive region thereof, the predetermined color component in the color space being a Cb color component in a YCbCr color space, and an adjusting degree for an enhancement amount in a positive region of the Cb color component being greater than an adjusting degree for an enhancement amount in a negative region of the Cb color component of the YCbCr color space.

* * * * *